(12) United States Patent
Sauerwald et al.

(10) Patent No.: US 7,726,370 B2
(45) Date of Patent: Jun. 1, 2010

(54) VEHICLE WHEEL COMPRISING A WHEEL RIM AND RUBBER TIRE

(75) Inventors: Juergen H. Sauerwald, Winterberg (DE); Klaus Scholz, Korbach (DE)

(73) Assignee: Continental Aktiengesellschaft, Hannover (DE)

( * ) Notice: Subject to any disclaimer, the term of this patent is extended or adjusted under 35 U.S.C. 154(b) by 481 days.

(21) Appl. No.: 11/569,143

(22) PCT Filed: Sep. 30, 2004

(86) PCT No.: PCT/EP2004/010927

§ 371 (c)(1),
(2), (4) Date: Nov. 15, 2006

(87) PCT Pub. No.: WO2006/037353

PCT Pub. Date: Apr. 13, 2006

(65) Prior Publication Data

US 2007/0240800 A1 Oct. 18, 2007

(51) Int. Cl.
*B60C 7/24* (2006.01)
*B60C 7/00* (2006.01)

(52) U.S. Cl. .............. 152/246; 152/396; 301/11.2; 301/13.1; 301/19

(58) Field of Classification Search .......... 152/246, 152/323, 324, 375, 393, 394, 395, 396, 397, 152/398, 401, 402, 403, 300, 306; 301/11.1, 301/11.2, 13.1, 18, 19, 20, 21, 22, 30, 31

See application file for complete search history.

(56) References Cited

U.S. PATENT DOCUMENTS

| 575,230 | A | * | 1/1897 | Garrett | 301/89 |
|---|---|---|---|---|---|
| 1,067,744 | A | * | 7/1913 | Lane | 301/18 |
| 1,128,531 | A | * | 2/1915 | Schenk | 301/17 |
| 1,299,205 | A | * | 4/1919 | Morgan | 301/19 |
| 1,340,244 | A | * | 5/1920 | Osborne | 301/11.1 |
| 2,113,379 | A | * | 4/1938 | Maas | 295/11 |

FOREIGN PATENT DOCUMENTS

| DE | 190743 | 10/1907 |
|---|---|---|
| EP | 1312489 | 5/2003 |
| GB | 07250 | 3/1915 |

* cited by examiner

*Primary Examiner*—S. Joseph Morano
*Assistant Examiner*—Kip T Kotter
(74) *Attorney, Agent, or Firm*—Greenblum & Bernstein, P.L.C.

(57) ABSTRACT

A vehicle wheel with a wheel rim and a solid tire positioned on the wheel rim. The vehicle wheel has an annular upper shell having a first wedge-shaped surface and composed of at least two upper segments. Further, the vehicle wheel includes an annular lower shell composed of lower segments and having an outer circumference having a second wedge-shaped surface. Moreover, the second wedge-shaped surface is structured and arranged in a diametrically opposed manner to the first wedge-shaped surface. Additionally, the annular lower shell is arranged on the rim, the annular lower shell is arranged against the annular upper shell, and the annular upper shell is connected to the solid tire.

16 Claims, 8 Drawing Sheets

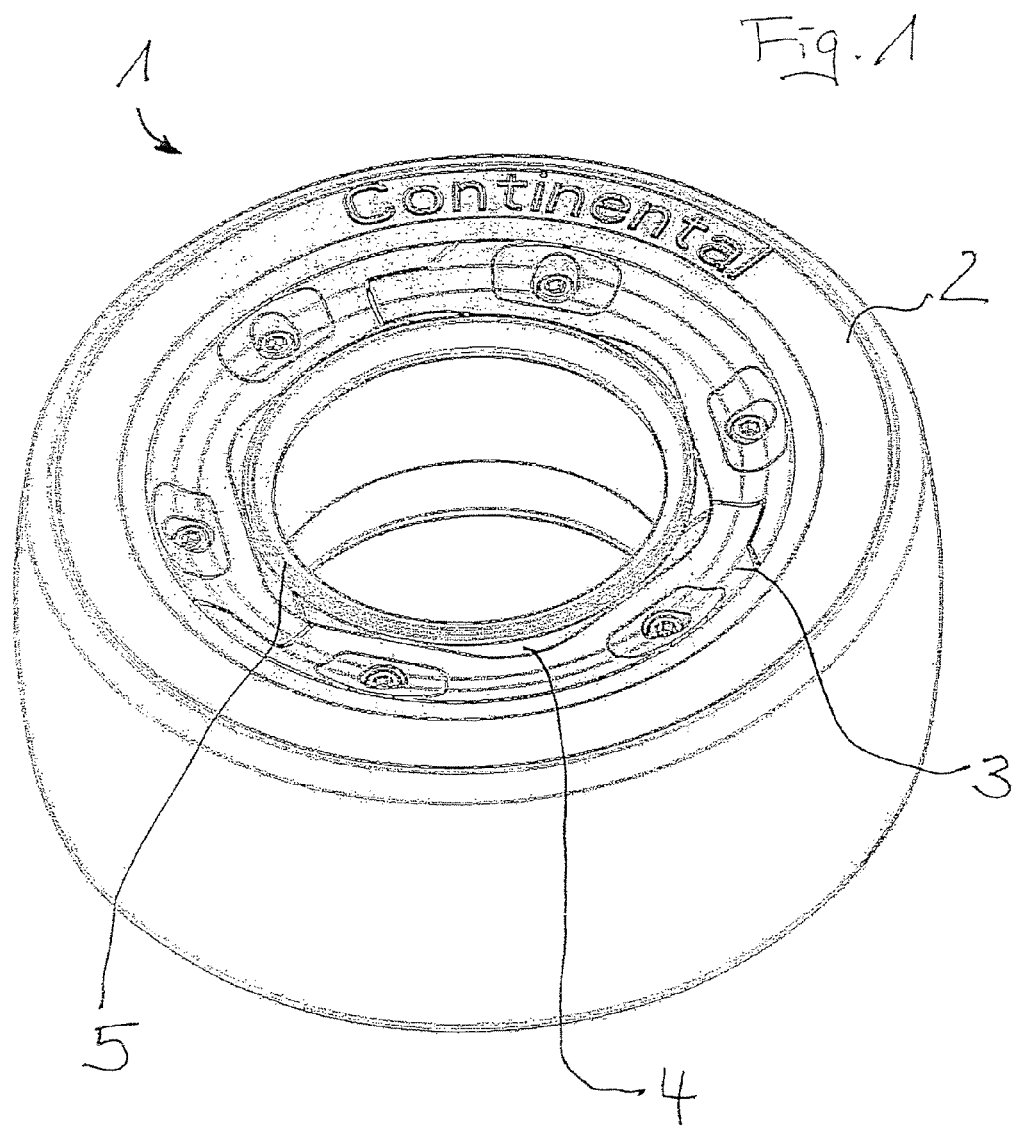

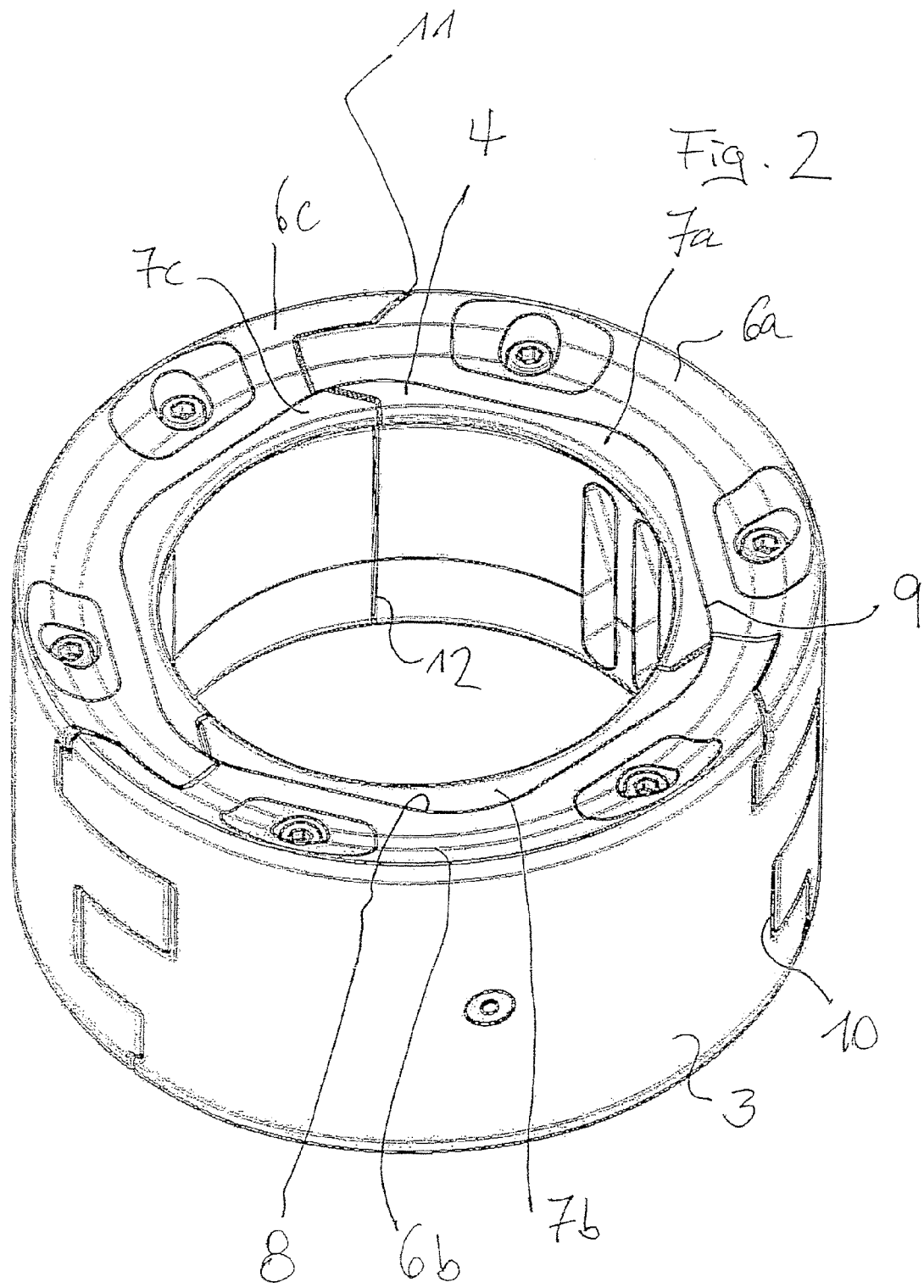

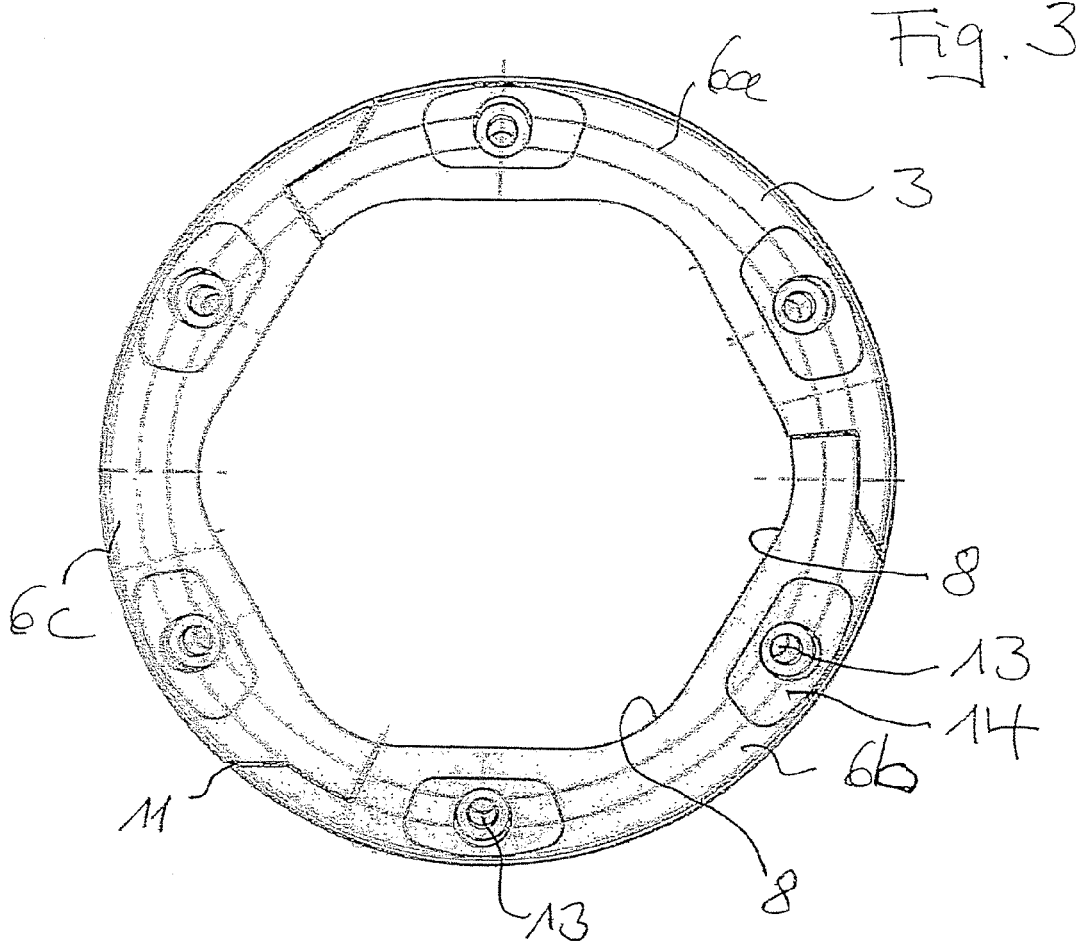
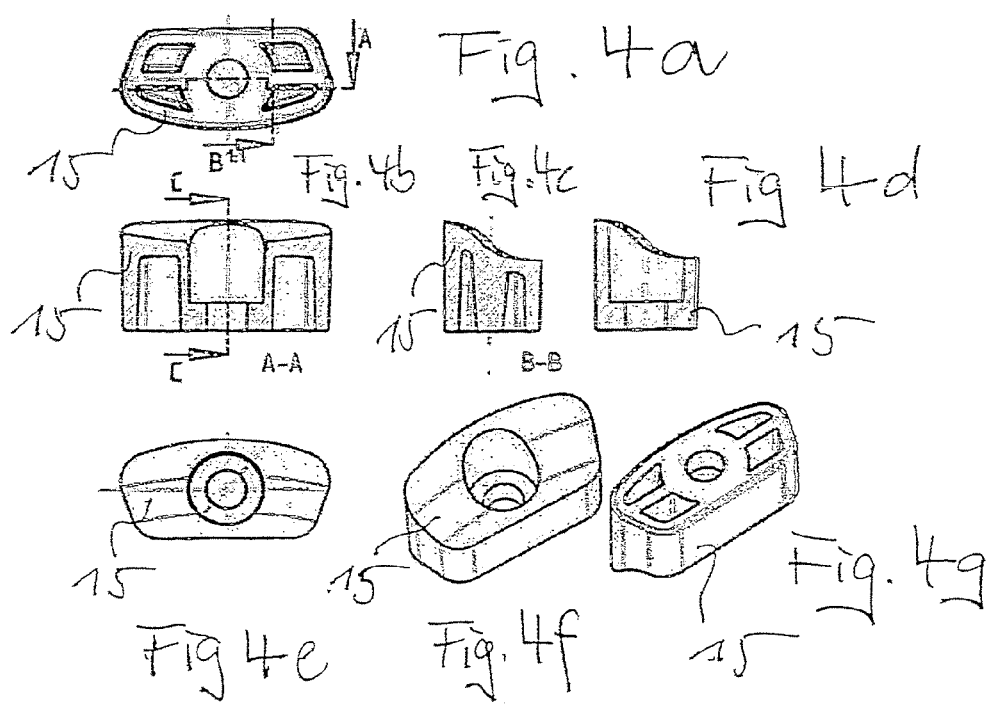

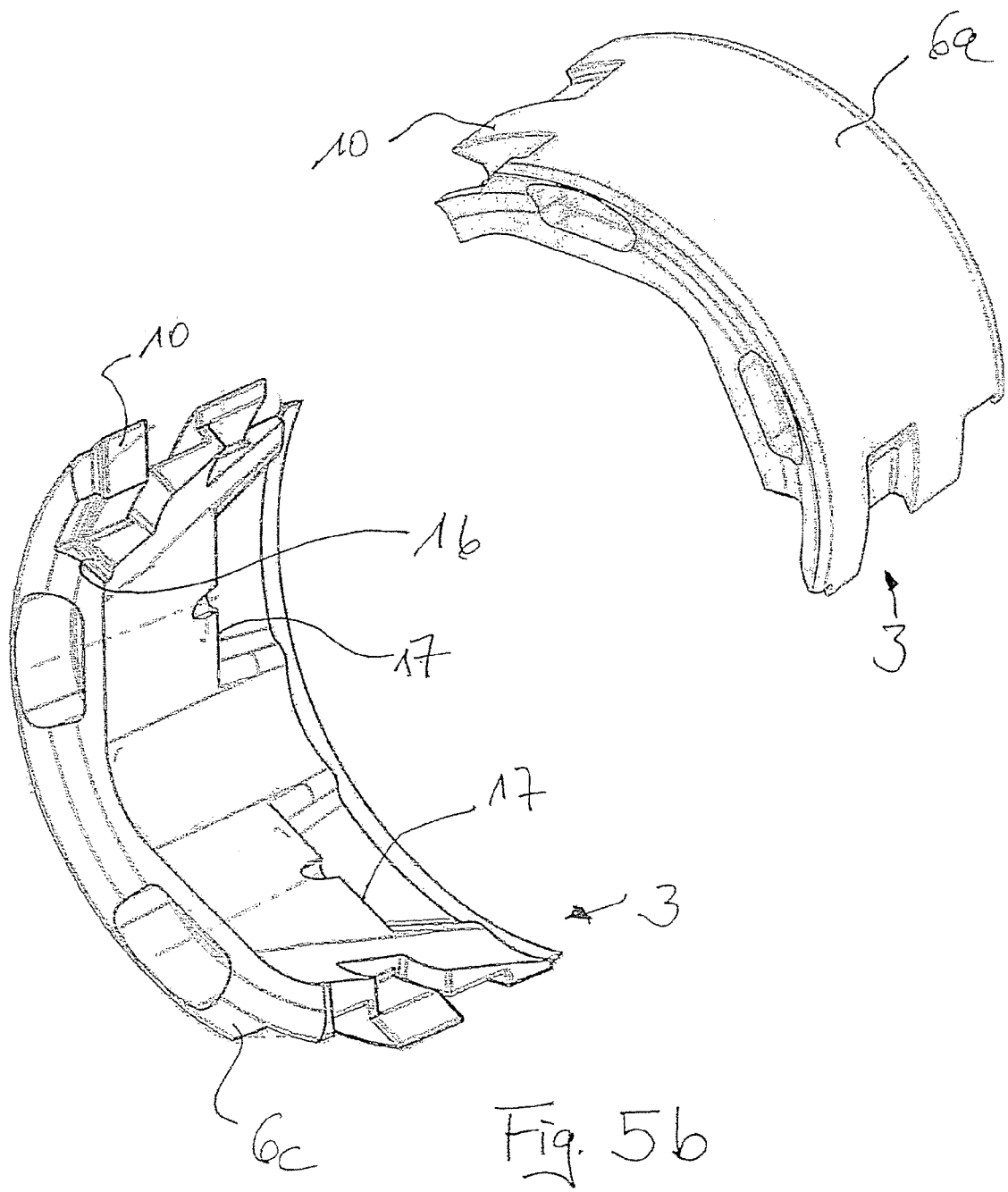

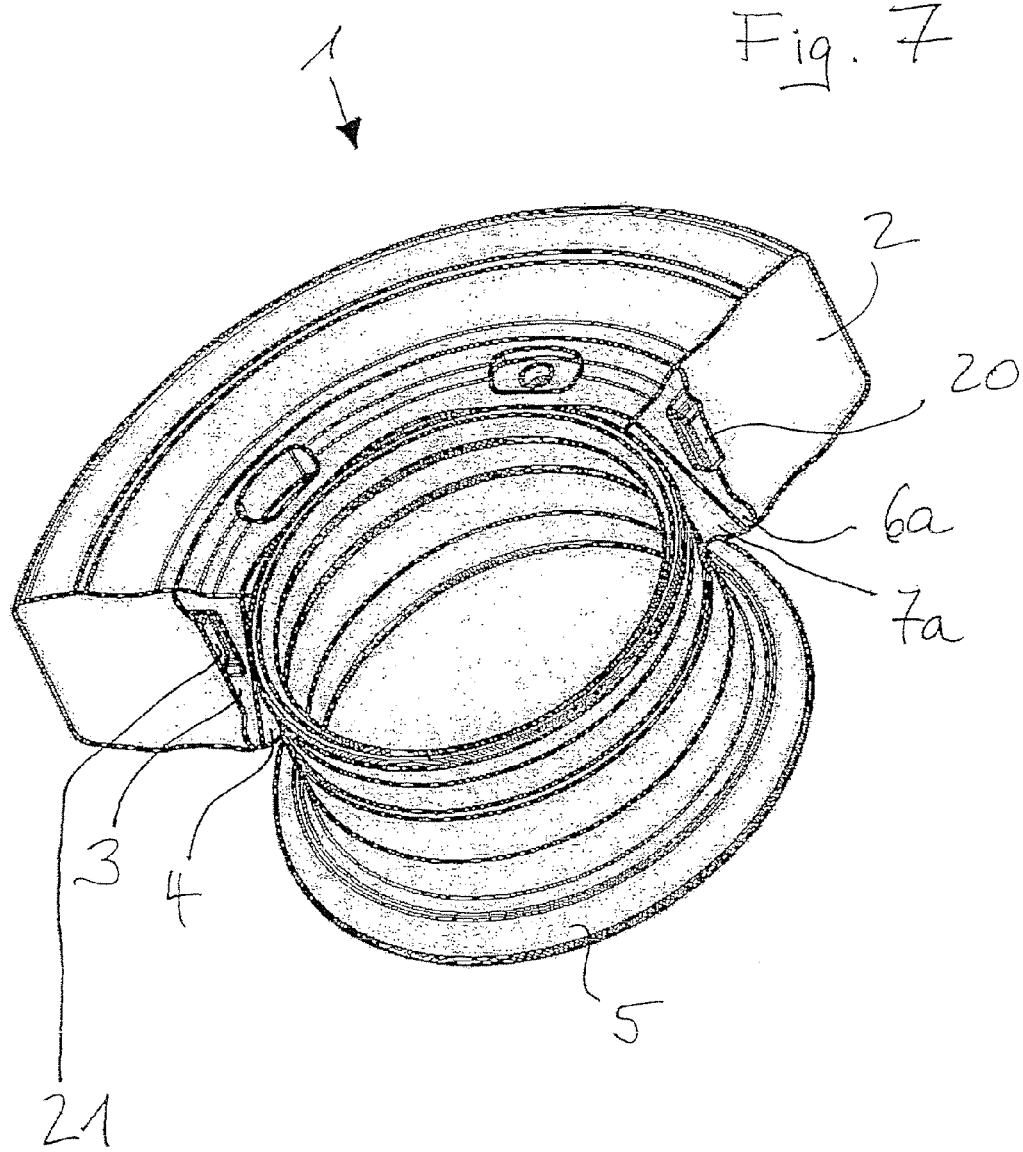

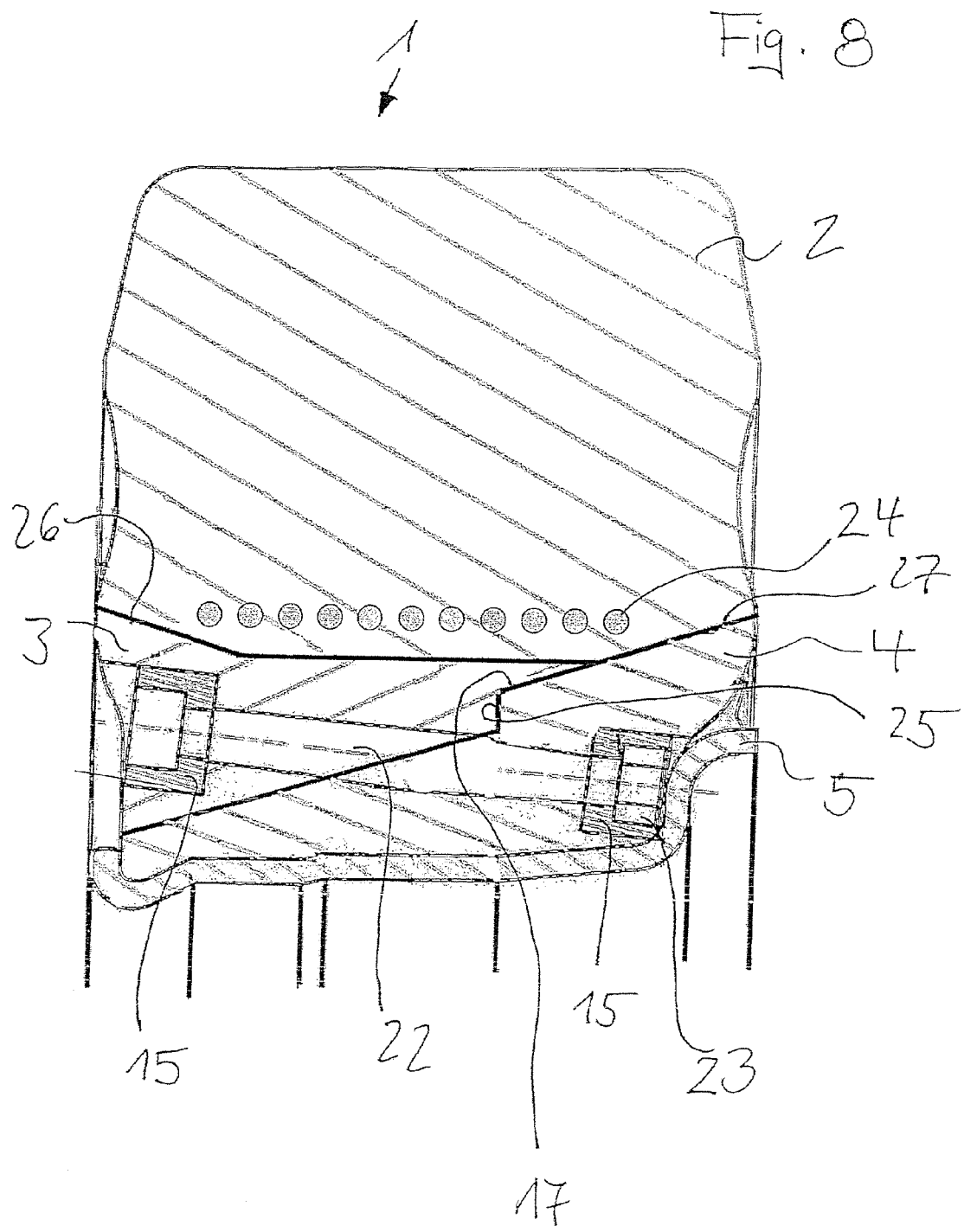

VEHICLE WHEEL COMPRISING A WHEEL RIM AND RUBBER TIRE

CROSS REFERENCE TO RELATED APPLICATIONS

The present application is a U.S. National Stage Application of International Application No. PCT/EP2004/010927 filed Sep. 30, 2004, which published as WO 2006/037353 A1 Apr. 13, 2006, the disclosure of which is expressly incorporated by reference herein in its entirety.

BACKGROUND OF THE INVENTION

1. Field of the Invention

The invention relates to a vehicle wheel with a wheel rim and a solid tire positioned on the wheel rim. The wheel rim includes an annular lower shell composed of segments and having a wedge-shaped surface on an outer circumference braced against a wedge-shaped surface of an annular upper shell embodied in a diametrically opposed manner to the wedge-shaped surface of the lower shell. The lower shell is arranged on the wheel rim and the upper shell is connected to the solid tire.

2. Description of Background Information

A vehicle wheel of this type is known from EP 1 312 489 A2. The essential thing with a vehicle wheel of this type is that an annular lower shell composed of segments and having a wedge-shaped surface on the outer circumference is arranged on the rim, which lower shell is braced against an annular upper shell having a wedge-shaped surface embodied in a diametrically opposed manner, which upper shell is firmly connected to the solid tire.

The advantage of a vehicle wheel of this type is that the solid tire that is fixedly arranged on the upper shell can be mounted on the lower shell and thus on the rim with the simplest device. A simple torque wrench is sufficient for mounting a tire of this type on a rim, while otherwise heavy-weight presses are used with all known solid tires for industrial purposes in order to press the solid tire directly onto the rim. However, suitable presses for pressing solid tires onto the rims are heavy and expensive and not available everywhere, so that it is difficult to have a new solid tire mounted onto a rim when needed, since long distances to a workshop equipped with a press of this type often have to be tolerated.

A construction known from EP 1 312 489 A2 can already overcome these disadvantages, since through the construction of segmented lower shell and one-piece upper shell with a tire vulcanized thereon, the simplest fitting is possible that can be carried out virtually anywhere.

Nevertheless, certain disadvantages have become apparent with a construction according to EP 1 312 489 A2, which are to be overcome through this invention.

The influence of heat on the construction of lower/upper shell has proven to be particularly problematic, in that, e.g., at high temperatures as a consequence of outer or inner temperature increases the upper shell has a tendency to undergo thermal expansion, through which a frictional contact between the upper and lower shell is not guaranteed in every case. The solid tire then begins to turn on the rim or on the lower shell.

SUMMARY OF THE INVENTION

This problem is solved in a surprisingly simple manner in the above-described vehicle tire with an upper shell composed of at least two, and preferably three to five segments.

According to the invention, a vehicle wheel known from EP 1 312 489 A2 can be formed such that the upper shell is assembled from at least two segments.

It has surprisingly been shown that the problem of the thermal expansion in particular can be solved in that the upper shell, like the lower shell, is composed of segments, namely of at least two segments, preferably of three to five segments. It is thus possible to get control of the thermal problems, in particular by assembling the segments of the upper shell so that expansion joints remain between the segments, which joints are able to equalize the thermal expansion.

It has been shown that the embodiment of the upper shell as a segmented upper shell entails other constructive advantages and embodiment possibilities. For example, it is possible to connect the segmented upper shell and the segmented lower shell by a positive connection, namely preferably through an embodiment of the radial congruent contours of upper shell and lower shell by a polygon or by a toothing.

Since the rubbing surfaces of the wedge-shaped shells (upper shell and lower shell) should have the lowest friction coefficient due to simple fitting and dismantling, but need to transfer high forces during braking and acceleration in terms of the longitudinal forces, a form closure of this system is particularly advantageous. The form closure is achieved by x-fold polygons, a toothing, a tongue-groove system or through a bayonet lock.

Furthermore, an embodiment of the upper shell in segmented form offers the advantage of providing it with an axial locking, e.g., in tongue and groove form, and a radial locking which in particular has the advantage that an improper torquing of the screw joint does not lead to a breaking of the belt of the solid tire arranged on the upper shell.

Furthermore, it can be expedient to provide the radially outer contour of the upper shell axially outside with a domed shoulder so that the radially outer contour of the upper shell as a whole has the form of a saddle. An embodiment of this type has proven to be advantageous since it counteracts the stress cracks occurring with high applied axle loads in the base area of the solid tire.

In practical embodiments of the invention it can be further advantageous to provide the upper shell and lower shell with diametrically opposed offsets. These offsets serve as a defined stop, so that the screw joint of upper and lower shell can be tightened only up to a defined point, which was not the case with purely conical surfaces according to EP 1 312 489 A2. Alternatively, it can also be advantageous to guide the screws respectively in one or two spacer sleeves which likewise have the purpose of a defined stop. Other known stop possibilities are likewise conceivable.

In order to design the fitting of upper and lower shell as simply as possible, it can be advantageous to provide the segments respectively of the lower shell and the upper shell with an arresting system or a click system on their face edges. Hereby, e.g., a face edge can be provided with a hook-like pin that engages in a corresponding recess in an end face of another segment and locks in place there. The fitting of the lower shells onto the rim is thereby made extremely easy in that the segments of the lower shell are simply placed on the compression rubber of the rim and connected to the other segments by the arresting connection so that a laborious and lengthy handling is avoided.

In a further practical embodiment, it can be advantageous to install pressure cases of a metallic material in the segments of the upper shell or lower shell, which on the one hand reduce the surface pressure, and on the other hand provide a collision guard for the segments preferably comprising plastic and the screw heads.

In another advantageous embodiment of the invention, it can be advantageous to give the vehicle tire an antistatic finish. In particular when upper and lower shell are made of plastic, the problem can occur that a static charge of the tire can be hard to dissipate. It can hereby be provided that a metal belt of the solid tire is electrically connected to at least one screw that connects the upper and lower shell, whereby the screw is electrically connected to the rim of the vehicle wheel. A connection of this type of the belt via the screw to the rim can be made in an extremely simple manner, e.g., in that a wire is connected to the belt and to a metallic pressure case of the screw, whereby the screw can be connected to the rim via a plain washer or another wire.

In another advantageous embodiment of the invention, it can be provided that the solid tire is vulcanized onto the upper shell composed of segments. Alternatively, it can be provided that the solid tire is a separate component that by the bracing of upper shell with lower shell is connected thereto, whereby in the braced condition an axially outer and upper edge of the lower shell is aligned with an axially outer and upper edge of the upper shell.

BRIEF DESCRIPTION OF THE DRAWINGS

Further advantages and embodiments of the invention are explained in more detail based on the drawings and the claims. The drawing shows, in each case true to scale:

FIG. 1 An exemplary embodiment of a vehicle wheel according to the invention in perspective view;

FIG. 2 A detail from FIG. 1 in perspective view;

FIG. 3 An upper shell of a vehicle wheel from FIGS. 1 and 2 from the side;

FIGS. 4a-4g A pressure case of an upper shell from FIG. 3 in various views;

FIGS. 5a, 5b Perspective views of two segments of the upper shell of the vehicle wheel from FIG. 1;

FIG. 7 A perspective partial sectional view of another embodiment of a vehicle wheel;

FIG. 8 A radial section through another embodiment of a vehicle wheel according to the invention.

DETAILED DESCRIPTION OF THE INVENTION

Figure 6A:
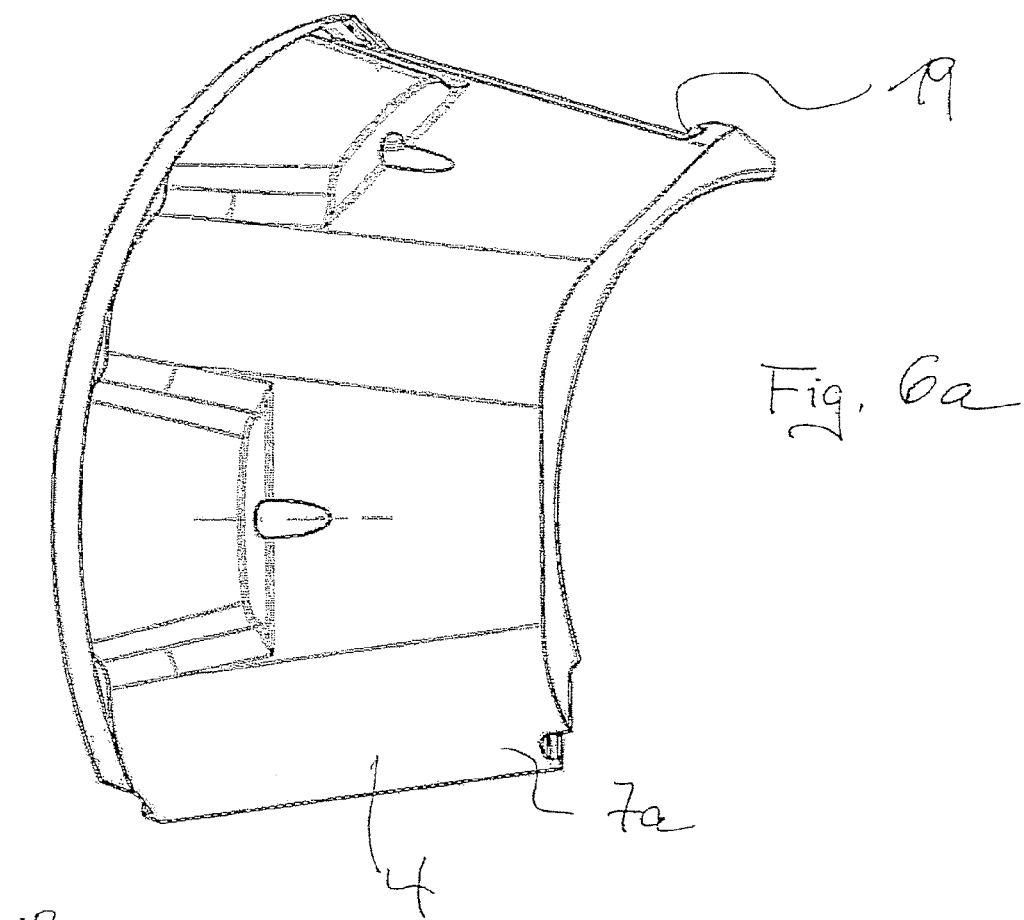
FIGS. 6a, 6b Perspective views of two lower shell segments in alternative embodiment.

FIG. 1 shows a first exemplary embodiment of a vehicle wheel 1 according to the invention in perspective view. The vehicle wheel 1, which is preferably used for fork lift trucks, earth-moving machinery, heavy-duty vehicles or similar slow-moving vehicles with high axial load, comprises a solid tire 2 that is connected to a rim 5 by an upper shell 3 and an lower shell 4.

The bond of upper (radially outer) shell 3 and lower (radially inner) shell 4 is shown in more detail in a perspective view in FIG. 2. The upper shell 3 comprises three segments 6a, 6b and 6c; the lower shell 4 is likewise composed of three segments 7a, 7b and 7c. The segments 6a through 6c of the upper shell 3 are connected by a positive connection to the segments 7a through 7c of the lower shell 4 in that the radially inner contour 8 of the upper shell 3 and the radially outer contour 9 of the lower shell 4 have the shape of a polygon. The segments 6a and 6b of the upper shell 3 have a toothing 10 that is used for the axial locking of the segments 6a and 6b. This locking has proven to be practical in particular when upper shell 3 and lower shell 4 are not braced with one another in a crossed-over manner. The toothing thereby helps so that the segments cannot drift apart axially, then resulting in a danger that a solid tire 2 vulcanized on the upper shell 3 could become detached from the upper shell 3;

An expansion joint 11 is arranged between the segments 6a-6c of the upper shell 3, which can be seen particularly clearly between segments 6c and 6a; accordingly an expansion joint 12 is arranged between the segments 7a-7c of the lower shell 4, which can be seen particularly between segments 7c and 7a. The expansion joints 11 and 12 serve to balance thermal expansions when the vehicle wheel 1 is heated during operation or during high outside temperatures. Through the embodiment of the expansion joints 11 and 12 of the configuration shown in FIGS. 1 and 2, it is ensured that lower shell 4 and upper shell 3 hold together under various temperature conditions.

FIG. 3 shows the upper shell 3 from FIG. 2 from the side. It is possible to discern here in particular the inner contour 8 embodied as a polygon, the expansion joint 11 and bores 13 in which screws for bracing against the lower shell 4 can be inserted. Recesses 14 are respectively sunk around the bores 13, into which recesses pressure cases 15 are inserted. The pressure cases 15 are shown in FIGS. 4a through 4g from below, from above, in a perspective view from above and below and in sectional representations in a self-explanatory manner. The pressure cases 15 can be composed of metallic materials, in particular of diecast aluminum or zinc die-casting, or of glass fiber reinforced plastic. The upper shell 3 and the lower shell 4 are composed respectively of plastic, in particular of polyamide. The pressure cases are used to better distribute the pressure exerted by the screws on the upper shell 3 and the lower shell 4.

FIGS. 5a and 5b show two segments 6a and 6c of the upper shell in a perspective view. The toothing 10 and a dirt guard 16 can be discerned in particular there. The dirt guard 16 serves a self-cleaning purpose in that dirt that has possibly penetrated into the segment separation joints during thermal expansion can be pressed out again. Furthermore, FIG. 5b shows a stop edge 17, which will be discussed in detail later.

Figure 6B:
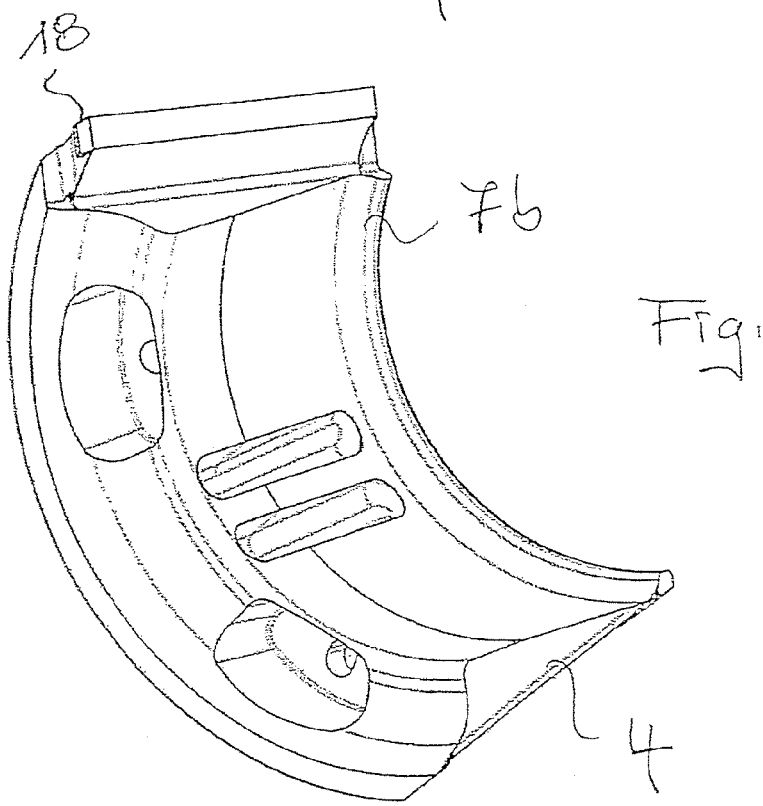

FIGS. 6a and 6b show segments 7a and 7b of the lower shell 4, which segments have congruent mating surfaces to the segments 6a and 6c of the upper shell 3 shown in FIGS. 5a and 5b. The segment 7b has a click-stop element 18 that interacts with a click-stop element 19 shaped accordingly of the segment 7a. This renders possible a simple assembly of the segments 7a, 7b and 7c on the rim, in that the individual segments 7a through 7c are simply placed on a compression rubber on the rim 5 and engaged with one another.

FIG. 7 shows a rim 5 on which a segment 7a of the lower shell 4 and a segment 6a of the upper shell 3 is placed, whereby in addition a partial section of a solid tire 2 can be seen. Just like the lower shell segments 7a and 7c shown in FIGS. 6a and 6b, the segments 6a-6c of the upper shell 3 are provided with click-stop elements 20, 21 which are used for the simple joining of the segments 6a-6c and in addition the radial and axial locking.

FIG. 8 shows another exemplary embodiment of a vehicle wheel 1 according to the invention in a radial section. The lower shell 4 and the upper shell 3 are braced against one another by a screw 22, whereby the screw 22 is supported in pressure cases 15, whereby a nut 23 is supported in a pressure case 15 of the lower shell 4. Additionally, 24 indicates a metallic belt. The stop edge 17 of the upper shell 3 abuts against a corresponding stop edge 25 of the lower shell 4. A radially upper and axially outer surface 26 is embodied such that it is aligned at the same height with a radially upper and axially outer surface 27 of the lower shell 4. This embodiment makes it possible to use a solid tire 2 that is not connected to the upper shell 3 by vulcanization, but is tensioned on the rim by the upper shell 3 and the lower shell 4 as a separate component and is thus supported. This makes it possible to use the upper shell 3 as a separate component without it being necessary to convey the upper shell 3 to another vulcanization when a solid tire 2 is replaced.

Figure 9:
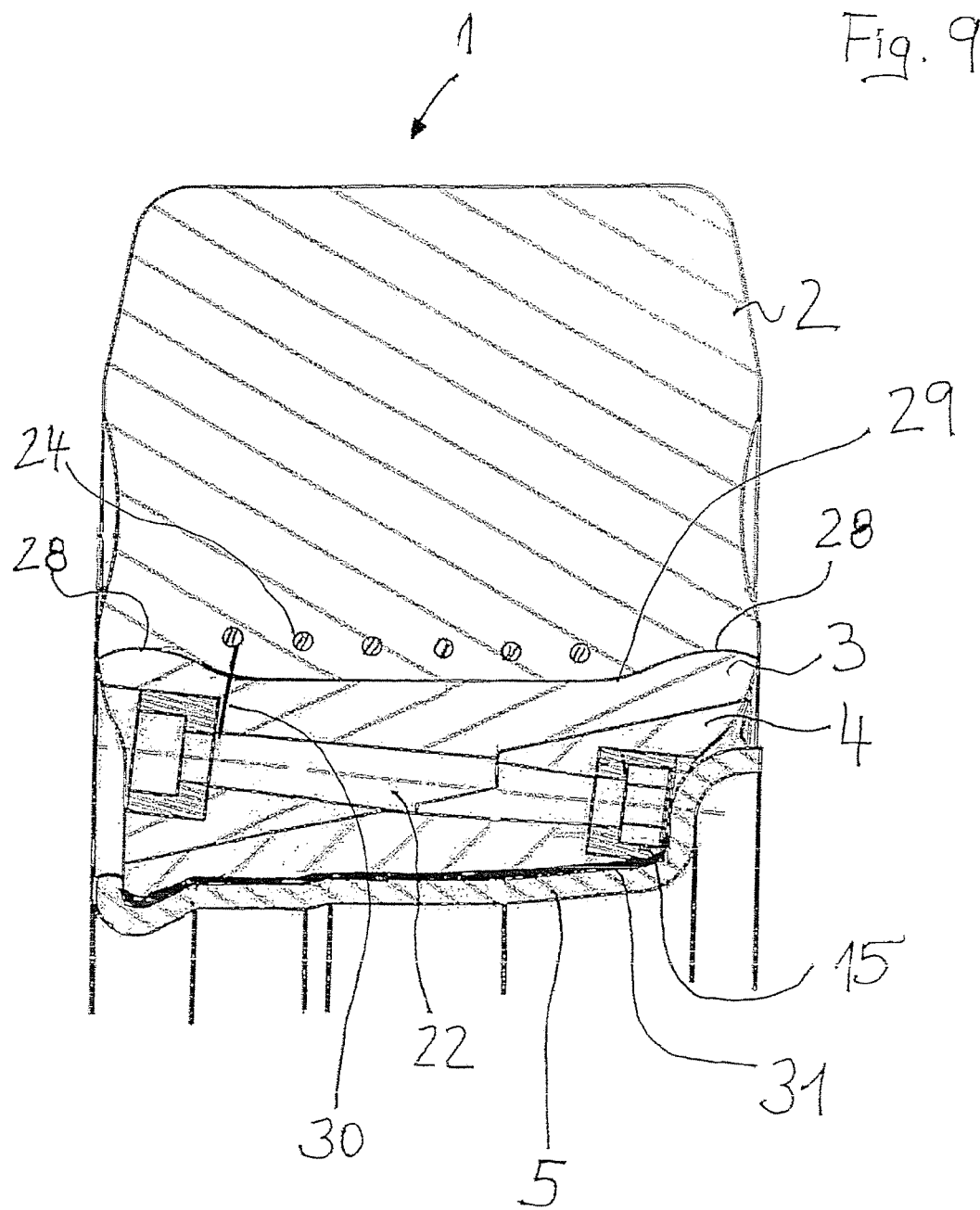
FIG. 9 A radial section through another embodiment of a vehicle wheel according to the invention.

FIG. 9 shows another exemplary embodiment of a vehicle wheel according to the invention in a radial section. The vehicle wheel 1 shown in FIG. 9 thereby largely corresponds to the embodiment shown in FIG. 8, whereby, however, in contrast to the embodiment shown in FIG. 8, the solid tire 2 is firmly joined to the upper shell 3, namely by vulcanization. In order to counteract stress cracks with high applied loads, radially upper and axially outer areas of the upper shell 3 are provided with a spherical shoulder 28, through which the radially outer contour of the upper shell 3 as a whole is given the shape of a saddle 29. This counteracts stress cracks that can occur with high axle loads.

Furthermore, the belt 24 has a connection 30 to the screw 22, whereby this connection 30 to the screw 22 is used for dissipating electrostatic discharges, resistance<$10^6$ Ohm, over the rim 5. Furthermore, if the screw 22 does not have a connection to the rim 5 via the pressure case 15, furthermore a corresponding connection can be provided from the screw 22 to the rim 5. If the upper shell 3 and lower shell 4 are made of plastic, such as polyamide, the dissipation of static discharges can also be carried out in that electrically conducting carbon black is mixed into the plastic.

Finally, in FIG. 9 the compression rubber 31 known per se can be briefly discerned, with which preferably a force-closed connection of the lower shell 4 to the rim 5 is obtained.

LIST OF REFERENCE NUMBERS

Part of the Specification

1 Vehicle wheel
2 Solid tire
3 Upper shell
4 Lower shell
5 Rim
6*b*, 6*c* Segments
7*b*, 7*c* Segments
8 Radially inner contour
9 Radially outer contour
10 Toothing
11 Expansion joint
12 Expansion joint
13 Bore
14 Recess
15 Pressure case
16 Dirt guard
17 Stop edge
18 Click-stop element
19 Click-stop element
20 Click-stop element
21 Click-stop element
22 Screw
23 Nut
24 Belt
25 Stop edge
26 Surface
27 Surface
28 Shoulder
29 Saddle
30 Connection
31 Compression rubber

The invention claimed is:

1. A vehicle wheel, comprising:
   a wheel rim;
   a solid tire positioned on the wheel rim;
   an annular upper shell coupled to the solid tire comprising at least two upper segments and having a first wedge-shaped surface;
   an annular lower shell coupled to the wheel rim comprising lower segments and having an outer circumference with a second wedge-shaped surface diametrically opposed to the first wedge-shaped surface; and
   the annular lower shell being braced against the annular upper shell,
   wherein the annular lower shell further comprises a radially outer polygonal contour and the annular upper shell further comprises a radially inner polygonal contour, such that the annular upper shell and the annular lower shell are joined to one another by a positive connection between the radially outer polygonal contour and the radially inner polygonal contour.

2. The vehicle wheel of claim 1, wherein the at least two upper segments comprises between three to five upper segments.

3. The vehicle wheel of claim 1, wherein the annular upper shell and the annular lower shell each further comprise stop edges.

4. The vehicle wheel of claim 1, further comprising at least one spacer sleeve defining a stop between the annular upper shell and the annular lower shell.

5. The vehicle wheel of claim 1, wherein the at least two upper segments comprise a toothing.

6. The vehicle wheel of claim 5, further comprising at least one dirt guard arranged in an area of the toothing of the at least two upper segments.

7. The vehicle wheel of claim 1, further comprising:
   upper expansion joints between the at least two upper segments; and
   lower expansion joints between the lower segments.

8. The vehicle wheel of claim 1, wherein the at least two upper segments and the lower segments further comprise end faces having click-stop elements arranged to connect the at least two upper segments together and to connect the lower segments together.

9. The vehicle wheel of claim 1, wherein the annular upper shell further comprises a radially outer contour having a saddle shape with two domed shoulders.

10. The vehicle wheel of claim 1, further comprising a toothing to positively connect the annular lower shell and annular upper shell to one another.

11. The vehicle wheel of claim 1, wherein the solid tire further comprises a belt electrically connectable to the rim.

12. A method of assembling a vehicle wheel, comprising:
   assembling an annular upper shell comprising at least two upper segments and a first wedge-shaped surface;
   assembling an annular lower shell comprising lower segments and an outer circumference having a second wedge-shaped surface;
   coupling the annular lower shell to a rim;
   coupling the annular upper shell to a solid tire; and
   connecting the solid tire to the wheel rim so the annular lower shell supports the annular upper shell,
   wherein the annular lower shell further comprises a radially outer polygonal contour and the annular upper shell further comprises a radially inner polygonal contour, such that the annular upper shell and the annular lower shell are joined to one another by a positive connection between the radially outer polygonal contour and the radially inner polygonal contour.

13. The method of claim 12, wherein the at least two upper segments comprises between three to five upper segments.

14. The method of claim 12, wherein the coupling of the annular upper shell to the solid tire is achieved without vulcanization.

15. The method of claim 12, wherein the coupling of the annular upper shell to the solid tire comprises vulcanization.

16. The method of claim 12, further comprising fixing the annular upper shell to the annular lower shell.

* * * * *